United States Patent
Mandal et al.

(10) Patent No.: US 10,797,856 B2
(45) Date of Patent: Oct. 6, 2020

(54) OUTSOURCING PROCESSING OPERATIONS WITH HOMOMORPHIC ENCRYPTION

(71) Applicant: FUJITSU LIMITED, Kawasaki-shi, Kanagawa (JP)

(72) Inventors: Avradip Mandal, Sunnyvale, CA (US); Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 245 days.

(21) Appl. No.: 15/956,626

(22) Filed: Apr. 18, 2018

(65) Prior Publication Data
US 2019/0327077 A1   Oct. 24, 2019

(51) Int. Cl.
| H04L 29/00 | (2006.01) |
| H04L 9/00 | (2006.01) |
| H04L 9/06 | (2006.01) |
| H04L 9/08 | (2006.01) |

(52) U.S. Cl.
CPC ............ *H04L 9/008* (2013.01); *H04L 9/0618* (2013.01); *H04L 9/0861* (2013.01)

(58) Field of Classification Search
CPC ..... H04L 9/0618; H04L 9/008; H04L 9/0861; H04L 2209/122; H04L 2209/127
See application file for complete search history.

(56) References Cited

U.S. PATENT DOCUMENTS

| 2013/0329883 | A1* | 12/2013 | Tamayo-Rios | H04L 9/008 380/28 |
| 2016/0105402 | A1* | 4/2016 | Soon-Shiong | H04L 63/0428 713/164 |
| 2016/0323098 | A1* | 11/2016 | Bathen | H04L 63/0428 |
| 2017/0357749 | A1* | 12/2017 | Laine | G06F 21/6245 |
| 2018/0285576 | A1* | 10/2018 | Cannings | G06F 21/602 |
| 2018/0294950 | A1* | 10/2018 | Khedr | G09C 1/00 |
| 2018/0375640 | A1* | 12/2018 | Laine | H04L 9/008 |
| 2019/0007197 | A1* | 1/2019 | Laine | H04L 9/3093 |

FOREIGN PATENT DOCUMENTS

| EP | 3113438 A1 | 1/2017 |

OTHER PUBLICATIONS

European Search Report in application No. 19165431.8 dated Aug. 30, 2019.
(Continued)

*Primary Examiner* — Don G Zhao
(74) *Attorney, Agent, or Firm* — Maschoff Brennan

(57) ABSTRACT

A method of outsourcing an operation with encryption is provided. A method may include encrypting data at trusted execution environment (TEE) to generate a first ciphertext. The method may also include conveying the first ciphertext to a graphics processing unit (GPU). Further, the method may include performing, at the GPU, at least one somewhat homomorphic encryption (SHE) evaluation operation on the first ciphertext to generate a second ciphertext. Moreover, the method may include conveying the second ciphertext to the TEE. In addition, the method may include decrypting, at the TEE, the second ciphertext to generate a function.

17 Claims, 6 Drawing Sheets

(56) References Cited

OTHER PUBLICATIONS

Tian et al., "Somewhat Homomorphic Cryptography for Matrix Multiplication Using GPU Acceleration", International Symposium on Biometric and Security Technologies, Aug. 26, 2014.
Diallo et al., "Nomad: A Framework for Developing Mission-Critical Cloud-based Applications", International Conference on Availability, Reliability and Security, Aug. 24, 2015.
Gentry, Craig. "Fully homomorphic encryption using ideal lattices." STOC. vol. 9. No. Jun. 2, 2009.
López-Alt, Adriana, Eran Tromer, and Vinod Vaikuntanathan. "On-the-fly multiparty computation on the cloud via multikey fully homomorphic encryption." Proceedings of the forty-fourth annual ACM symposium on Theory of computing. ACM, May 19, 2012.
Van Dijk, Marten, et al. "Fully homomorphic encryption over the integers." Annual International Conference on the Theory and Applications of Cryptographic Techniques. Springer Berlin Heidelberg, Jun. 8, 2010.
Brakerski, Zvika, and Vinod Vaikuntanathan. "Efficient fully homomorphic encryption from (standard) LWE." SIAM Journal on Computing 43.2 (Oct. 2011): 831-871.
Gentry, Craig, and Shai Halevi. "Implementing Gentry's Fully-Homomorphic Encryption Scheme." EUROCRYPT. vol. 6632. Feb. 4, 2011.
Ben A. Fisch, Dhinakaran Vinayagamurthy, Dan Boneh, Sergey Gorbunov. "Iron: Functional Encryption using Intel SGX." Cryptology ePrint Archive, Oct. 30, 2017, https://eprint.iacr.org/2016/1071.
"Secure Multiparty Computation from SGX". / Portela, Bernardo; Barbosa, Manuel B M; Brasser, Ferdinand; Portela, Bernardo; Sadeghi, Ahmad-Reza; Scerri, Guillaume; Warinschi, Bogdan. Financial Cryptography and Data Security 2017: Twenty-First International Conference, Apr. 3-7, 2017, The Palace Hotel, Malta . International Financial Cryptography Association.
Nayak, Kartik and Fletcher, Christopher W. and Ren, Ling and Chandran, Nishanth and Lokam, Satya and Shi, Elaine and Goyal, Vipul: HOP: Hardware makes Obfuscation Practical, Feb. 26, 2017.
Rikke Bendlin, Ivan Damgård, Claudio Orlandi, and Sarah Zakarias. "Semi-homomorphic encryption and multiparty computation." In Proceedings of the 30th Annual international conference on Theory and applications of cryptographic techniques: advances in cryptology(EUROCRYPT'11), Kenneth G. Paterson (Ed.). Springer-Verlag, Berlin, Heidelberg, 169-188, May 15, 2011.
Dai, Wei, and Berk Sunar. "cuHE: A Homomorphic Encryption Accelerator Library." Cryptography and Information Security in the Balkans. Springer International Publishing, Aug. 17, 2015. 169-186.
Dai, Wei, Yarkin Doröz, and Berk Sunar. "Accelerating NTRU based homomorphic encryption using GPUs." High Performance Extreme Computing Conference (HPEC), IEEE, Sep. 9, 2014.
Dai, Wei, Yarkin Doröz, and Berk Sunar. "Accelerating SWHE Based PIRs Using GPUs." Financial Cryptography and Data Security: FC 2015 International Workshops, BITCOIN, WAHC, and Wearable, San Juan, Puerto Rico, Jan. 30, 2015, Revised Selected Papers. vol. 8976. Springer.

\* cited by examiner

OUTSOURCING PROCESSING OPERATIONS WITH HOMOMORPHIC ENCRYPTION

FIELD

The embodiments discussed herein relate to outsourcing processing operations with homomorphic encryption.

BACKGROUND

A trusted execution environment (TEE), which is a secure area of a processor, may provide security guarantees such as confidentiality of user data, even while performing operations (e.g., computations) on the user data.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include encrypting data at trusted execution environment (TEE) to generate a first ciphertext. The method may also include conveying the first ciphertext to a graphics processing unit (GPU). Further, the method may include performing, at the GPU, at least one somewhat homomorphic encryption (SHE) evaluation operation on the first ciphertext to generate a second ciphertext. Moreover, the method may include conveying the second ciphertext to the TEE. In addition, the method may include decrypting, at the TEE, the second ciphertext to generate a function.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Various embodiments discussed herein relate to outsourcing one or more processing operations via encryption (e.g., homomorphic encryption). More specifically, for example, one or more processing operations (e.g., TEE computations) may be outsourced from a TEE (e.g., of a central processing unit (CPU)) to another processing unit (e.g., graphics processing unit (GPU)) with encryption (e.g., homomorphic encryption).

Fully homomorphic encryption (FHE) may allow for processing operations (e.g., computations) to be performed on a ciphertext of a message. Further, FHE may allow for decryption and recovery of the message. FHE is inherently inefficient and may be considered impractical. A "weaker" variant of FHE, referred to as "somewhat homomorphic encryption" (SHE), allows for homomorphic encryption, but for limited or smaller operations (e.g., computations). In most instances, SHE is much faster than FHE.

TEEs are secure areas of a processor (e.g., a main processor (e.g., a central processing unit (CPU))) that may not be accessed, modified, or examined by any outside party. TEEs allow for performance of various cryptographic operations. TEEs are relatively efficient (e.g., fractionally slower than computing in the clear). However, TEEs only support relatively small amounts of memory and may not allow use of outside resources (e.g., GPUs).

GPUs may be configured for parallelization and/or single instruction multiple data (SIMD) processing. Further, compared to a CPU, GPUs may have lower clock speeds. Although GPUs may have been originally designed for graphics processing, more recently, GPUs are designed for more general computations.

In various embodiments of the present disclosure, SHE may be used within a TEE to implement more efficient secure computation with the TEE using outside resources, such as a GPU. For example, in at least some embodiments, one or more secure computations may be split into multiple SHE computations wherein a TEE may be used in a secure manner.

Various embodiments disclosed herein may eliminate some of the drawbacks of TEEs for performing expensive computations efficiently and without resorting to slow cryptographic schemes, such as software FHE.

Thus, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

Embodiments of the present disclosure will be explained with reference to the accompanying drawings.

Figure 1:
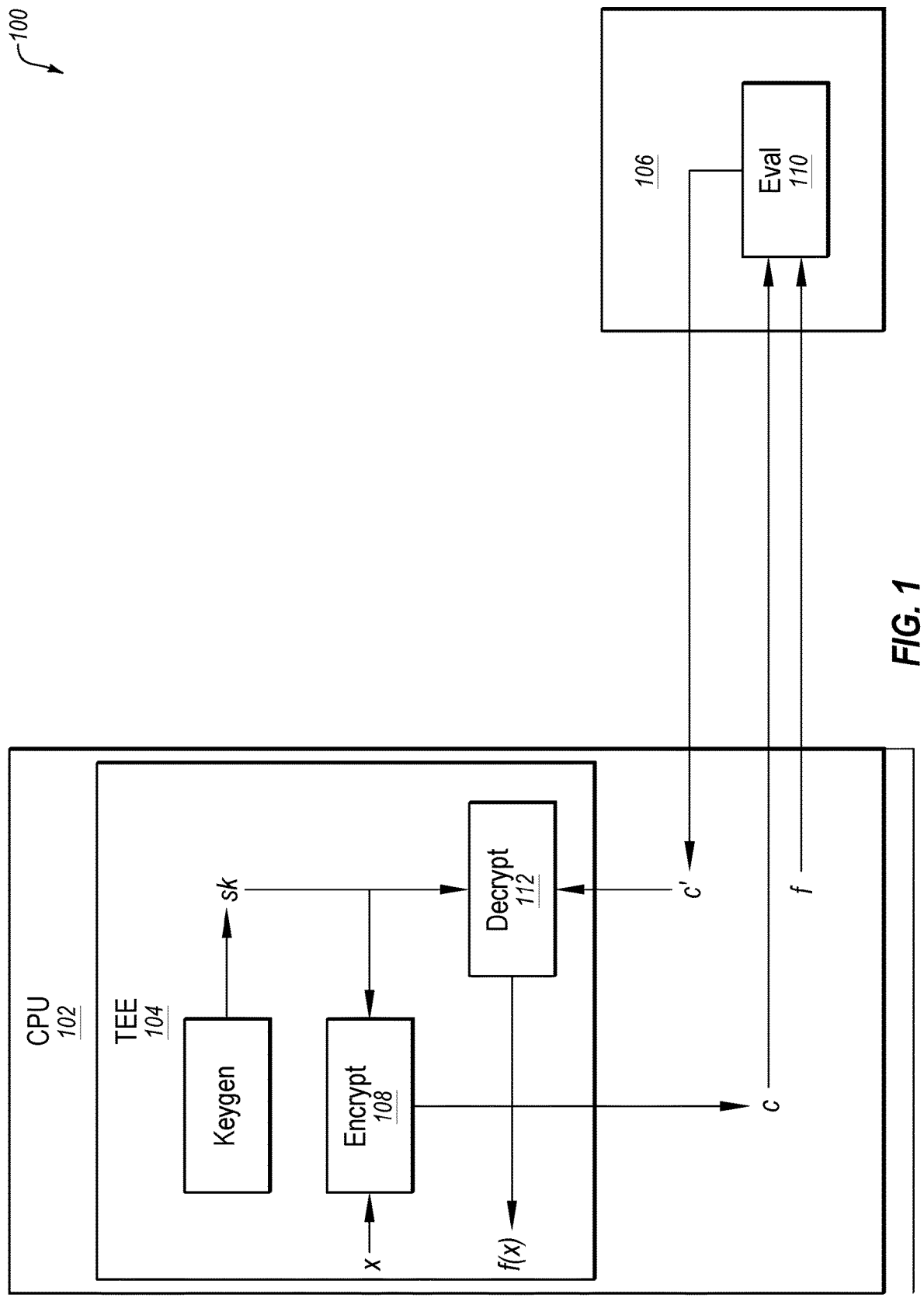
FIG. 1 illustrates an example system including a trusted execution environment.

FIG. 1 illustrates an example system 100, according to at least one embodiment of the present disclosure. System 100 includes a central processing unit (CPU) 102, a TEE 104, and a processing unit 106. In at least some embodiments, TEE 104 may be within CPU 102. For example, processing unit 106 may include a graphics processing unit (GPU).

According to at least some embodiments, TEE 104 may be configured to encrypt an input (e.g., a message) and generate a ciphertext. More specifically, for example, TEE 104 may be configured to receive an input x (e.g., an input received at processing unit 102) and generate a ciphertext c via an Encrypt function 108. Further, the ciphertext may be conveyed to processing unit 106, which, as described more fully herein, may be configured to generate another ciphertext. In at least some embodiments, ciphertext c and a function $f$ (also referred to herein as an intermediate function) may be conveyed from TEE 104 to processing unit 106.

Further, for example, processing unit 106 may be configured to receive ciphertext c, perform a SHE operation (e.g., a SHE evaluation) (e.g., via an Eval function 110) of function $f$ on ciphertext c to generate ciphertext c'. Moreover, processing unit 106 may be configured convey the other ciphertext (e.g., ciphertext c') to TEE 104 for decryption. For example, upon receipt thereof, TEE 104 may decrypt ciphertext c' (e.g., via a Decrypt function 112) to generate a function $f(x)$. TEE 104 may further include a Keygen function 114 for generating a secret key sk, which may be used for decryption (e.g., decryption of ciphertext c').

Some embodiments of the present disclosure may relate to determining whether a TEE (e.g., TEE 104) should outsource one or more operations (e.g., computations) to another processing unit (e.g., processing unit 106). In at least some embodiments, various factors may be considered in determining whether to outsource one or more operations. For example, a computation time of a function at a TEE (e.g., TEE 104), an encryption time of an input (e.g., a message) at the TEE, an operation time (e.g., an evaluation time) of the function at the other processing unit (e.g., processing unit 106), and/or a decryption time of ciphertext at the TEE may be considered in determining whether to outsource an operation (e.g., a computation).

Figure 2:
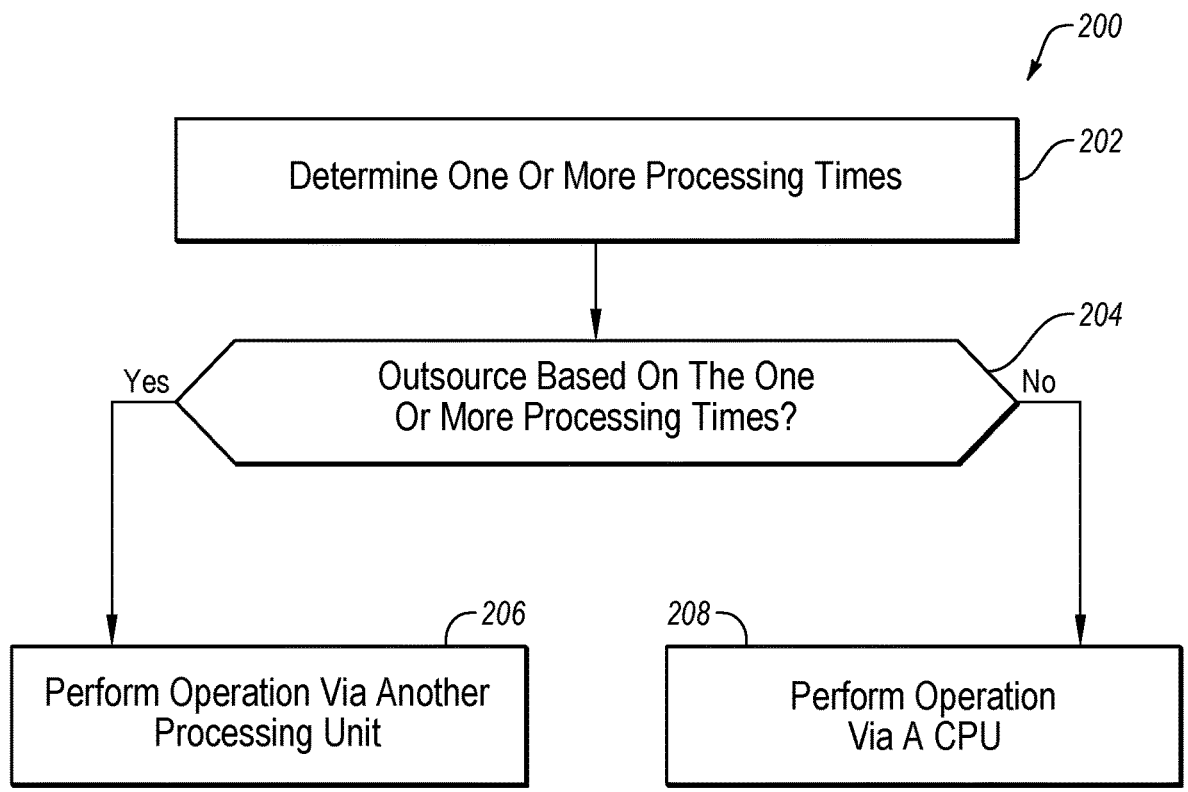
FIG. 2 depicts an example flow diagram of a method of determining whether to outsource an operation.

FIG. 2 illustrates a flowchart of an example method 200 of determining whether to outsource an operation, in accordance with one or more embodiments of the present disclosure. In some embodiments, one or more of the operations associated with method 200 may be performed by system 100 of FIG. 1. Alternately or additionally, method 200 may be performed by any suitable system, apparatus, or device. For example, processor 610 of system 600 shown in FIG. 6 may perform one or more of the operations associated with method 200. Although illustrated with discrete blocks, the steps and operations associated with one or more of the blocks of method 200 may be divided into additional blocks, combined into fewer blocks, or eliminated, depending on the desired implementation.

At block 202, one or more processing times for one or more operations associated with a system (e.g., system 100 of FIG. 1) may be determined, and method 200 may proceed to block 204. For example, one or more of a computation time for performing a function (e.g., function $f$; see FIG. 1) at a TEE (e.g., TEE 104 of FIG. 1) of a central processing unit (e.g., CPU 102 of FIG. 1), an encryption time of an input (e.g., input x; see FIG. 1) at the TEE, an evaluation time (e.g., a homomorphic evaluation time) of the function at another processing unit (e.g., processing unit 106 of FIG. 1), and a decryption time of a ciphertext (e.g., ciphertext c' of FIG. 1) at the TEE may be determined.

At block 204, a determination may be made as to whether to outsource one or more operations. In some embodiments, the determination may be made based on at least one of the processing times determined at block 202. If it is determined to outsource the one or more operations, method 200 may proceed to block 206. If it is determined to not outsource the one or more operations, method 200 may proceed to block 208.

For example, in at least some embodiments, if a computation time of a function at a TEE (e.g., TEE 104) is greater than the sum of 1) an encryption time of an input at the TEE; 2) an evaluation time of the function at the other processing unit (e.g., processing unit 106); and 3) a decryption time of ciphertext at the TEE, it may be determined to outsource the computation to the other processing unit (e.g., processing unit 106 of FIG. 1) (e.g., if computation time of function $f$ in TEE 104>(encryption time of input x in TEE 104+ homomorphic evaluation time of function $f$ in processing unit 106+decryption time of ciphertext c' in TEE 104), then the computation of function $f$ may be outsourced).

If the computation time of a function at the TEE (e.g., TEE 104) is less than or equal to the sum of 1) the encryption time of an input at the TEE; 2) the evaluation time of the function at the other processing unit (e.g., processing unit 106); and 3) the decryption time of ciphertext at the TEE, it may be determined to not outsource the computation to the other processing unit (e.g., if computation time of function $f$ in TEE 104 !>(encryption time of input x in TEE 104+ homomorphic evaluation time of function $f$ in processing unit 106+decryption time of ciphertext c' in TEE 104), then the computation of function $f$ may not be outsourced).

At block 206, the one or more operations may be performed at the other processing unit (e.g., processing unit 106 of FIG. 1). At block 208, the one or more operations may be performed at the TEE (e.g., at CPU 102 of FIG. 1).

Modifications, additions, or omissions may be made to method 200 without departing from the scope of the present disclosure. For example, in some embodiments, at block 202, computation times of n functions $f_1$ (e.g., for evaluation of (e.g., $f_1(x_1), \ldots, f_n(x_n)$)) at the TEE, an encryption time of an input (e.g., input x; see FIG. 1) at the TEE, evaluation times (e.g., a homomorphic evaluation times) of n functions $f_i$ at another processing unit (e.g., processing unit 106 of FIG. 1), and a decryption time of a ciphertext (e.g., ciphertext $c_n'$ of FIG. 1) may be determined.

Further, in this example, at block 204, if computation times of the n functions at a TEE (e.g., TEE 104) is greater than the sum of 1) an encryption time of an input at the TEE; 2) the evaluation times of the n functions at the other processing unit (e.g., processing unit 106); and 3) a decryption time of ciphertext at the TEE, it may be determined to outsource the operations to the other processing unit (e.g., processing unit 106 of FIG. 1).

Further, for example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 3:
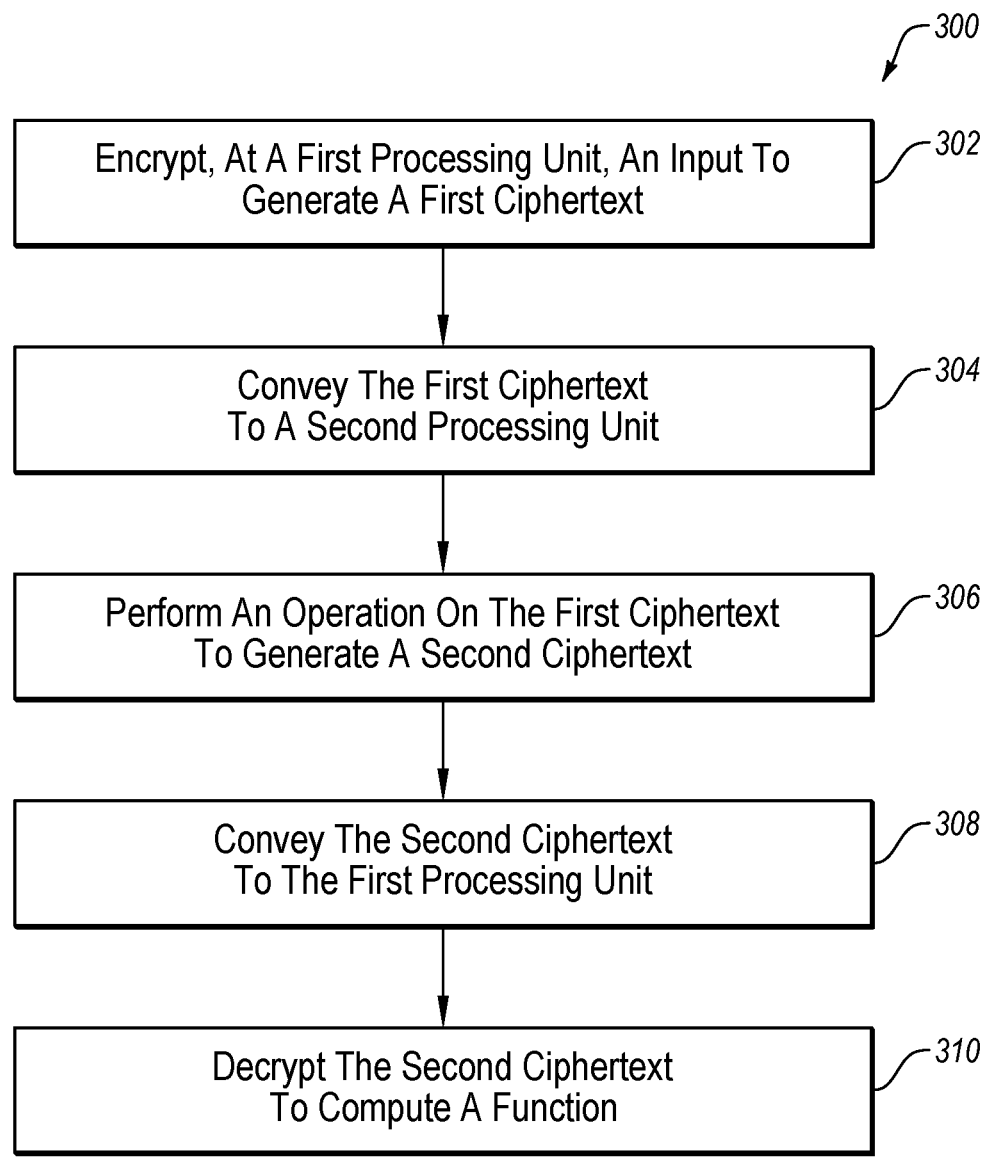
FIG. 3 depicts an example flow diagram of a method of outsourcing an operation with encryption.

FIG. 3 illustrates a flowchart of an example method 300 of outsourcing an operation with encryption, in accordance with one or more embodiments of the present disclosure. In some embodiments, one or more of the operations associated with method 300 may be performed by system 100 of FIG. 1. Alternately or additionally, method 300 may be performed by any suitable system, apparatus, or device. For example, processor 610 of system 600 shown in FIG. 6 may perform one or more of the operations associated with method 300. Although illustrated with discrete blocks, the steps and operations associated with one or more of the blocks of method 300 may be divided into additional blocks, combined into fewer blocks, or eliminated, depending on the desired implementation.

At block 302, an input may be encrypted at a first processing unit to generate a first ciphertext, and method 300 may proceed to block 304. For example, with reference to FIG. 1, an input x (e.g., a message) may be encrypted via homomorphic encryption at CPU 102 to generate ciphertext c. More specifically, for example, input x may be encrypted at TEE 104 of CPU 102. Further, for example, the input may be encrypted via processor 610 of FIG. 6.

At block 304, the first ciphertext may be conveyed to a second processing unit, and method 300 may proceed to block 306. For example, with reference to FIG. 1, ciphertext c may be conveyed to processing unit 106, which may include, for example, a GPU. Further, in at least some embodiments, a function (e.g., function $f$; see FIG. 1) may be conveyed from CPU 102 to processing unit 106.

At block 306, an operation may be performed on the first ciphertext to generate a second ciphertext, and method 300 may proceed to block 308. For example, with reference again to FIG. 1, a SHE evaluation (e.g., via Eval function 110) may be performed (e.g., based on function $f$) on ciphertext c to generate ciphertext c'.

At block 308, the second ciphertext may be conveyed to the first processing unit, and method 300 may proceed to block 310. For example, ciphertext c' may be conveyed from processing unit 106 to processing unit 102 (see FIG. 1).

At block 310, the second ciphertext may be decrypted to determine (e.g., compute) a function. For example, with reference to FIG. 1, ciphertext c' may be decrypted at TEE 104 (e.g., via Decrypt function 112) to compute function $f(x)$. Further, for example, the second ciphertext may be decrypted via processor 610 of FIG. 6.

Modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 4:
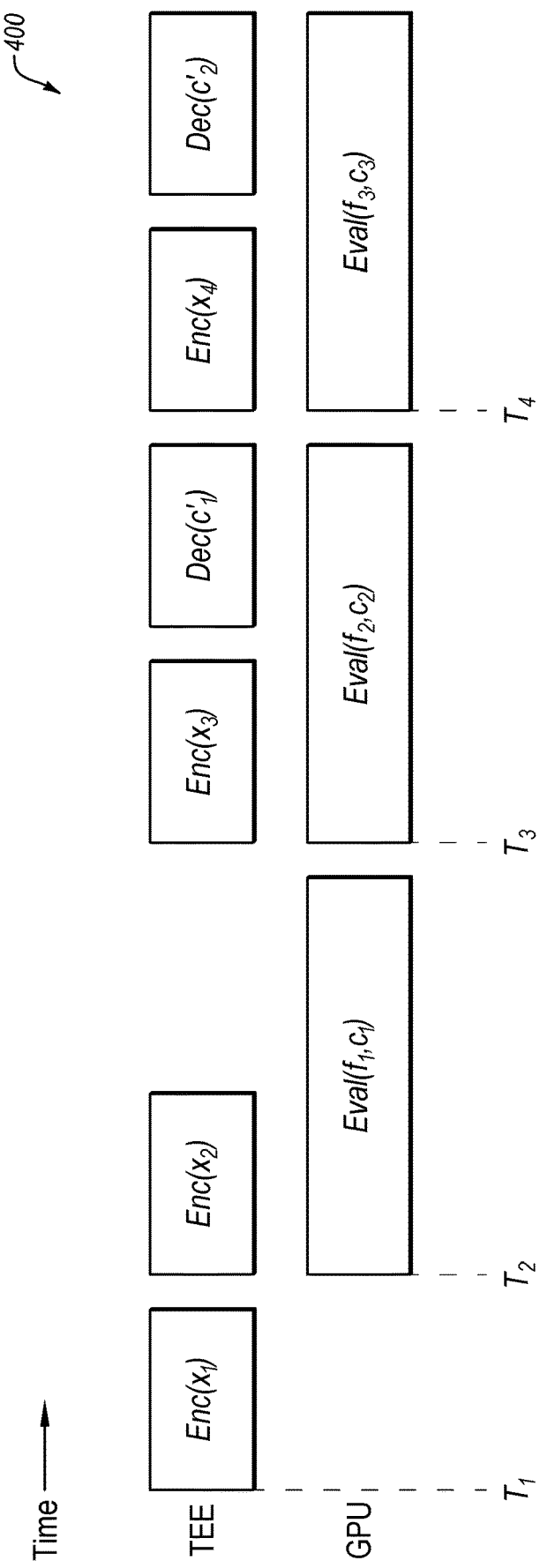
FIG. 4 depicts an example timing diagram for processing operations at a plurality of processing units.

In at least some embodiments, computations at a TEE (e.g., TEE 104 of FIG. 1) and another processor unit (e.g., processor 106 of FIG. 1) may be performed in parallel (e.g., via building a pipeline). FIG. 4 depicts an example timing diagram 400 for evaluation of a function (e.g., $f_1(x_1), \ldots, f_n(x_n)$). For example, at a time $T_1$, an input (e.g., a message) $x_1$ may be encrypted at a TEE (e.g., TEE 104 of FIG. 1) to generate a ciphertext $c_1$. Further, at a time $T_2$, an input (e.g., a message) $x_2$ may be encrypted at the TEE. Also, at time $T_2$, ciphertext $c_1$ may be evaluated (e.g., based on a function $f_1$) at a GPU to generate a ciphertext $c_{1'}$. At a time $T_3$, an input (e.g., a message) $x_3$ may be encrypted at the TEE to generate a ciphertext $c_3$, ciphertext $c_{1'}$ may be decrypted at the TEE, and ciphertext $c_2$ may be evaluated (e.g., based on a function $f_2$) at the GPU to generate a ciphertext $c_{2'}$. Moreover, at a time $T_4$, an input (e.g., a message) $x_4$ may be encrypted at the TEE, ciphertext $c_{2'}$ may be decrypted at the TEE, and ciphertext $c_3$ may be evaluated (e.g., based on a function $f_3$) at the GPU.

In one example use case including matrix multiplication, for matrices of dimension $O(n)$, in terms of addition and multiplication cost may be $O(n^3)$ or in terms of inner product evaluation cost may be $O(n^2)$.

For large matrices, a GPU implementation may be much faster (e.g., because an algorithm is highly parallelizable). For homomorphic encryption (e.g., using a TEE and a GPU), the cost for encryption/decryption, which occurs at the TEE, may have a cost of $O(n^2)$. The cost for evaluation may remain $O(n^3)$. For a fast SHE scheme, evaluation cost at a GPU may be considerably smaller than plain multiplication inside the TEE. Further, SHE schemes, which are very fast and parallelizable for inner product computations, are available.

Fully homomorphic encryption schemes may support an arbitrary function by bootstrapping SHE schemes, in accordance with various embodiments of the present disclosure. For example, bootstrapping may be achieved by refreshing a ciphertext periodically. Bootstrapping, which may be the bottleneck of FHE schemes, may be performed, in accordance with various embodiments.

Figure 5:
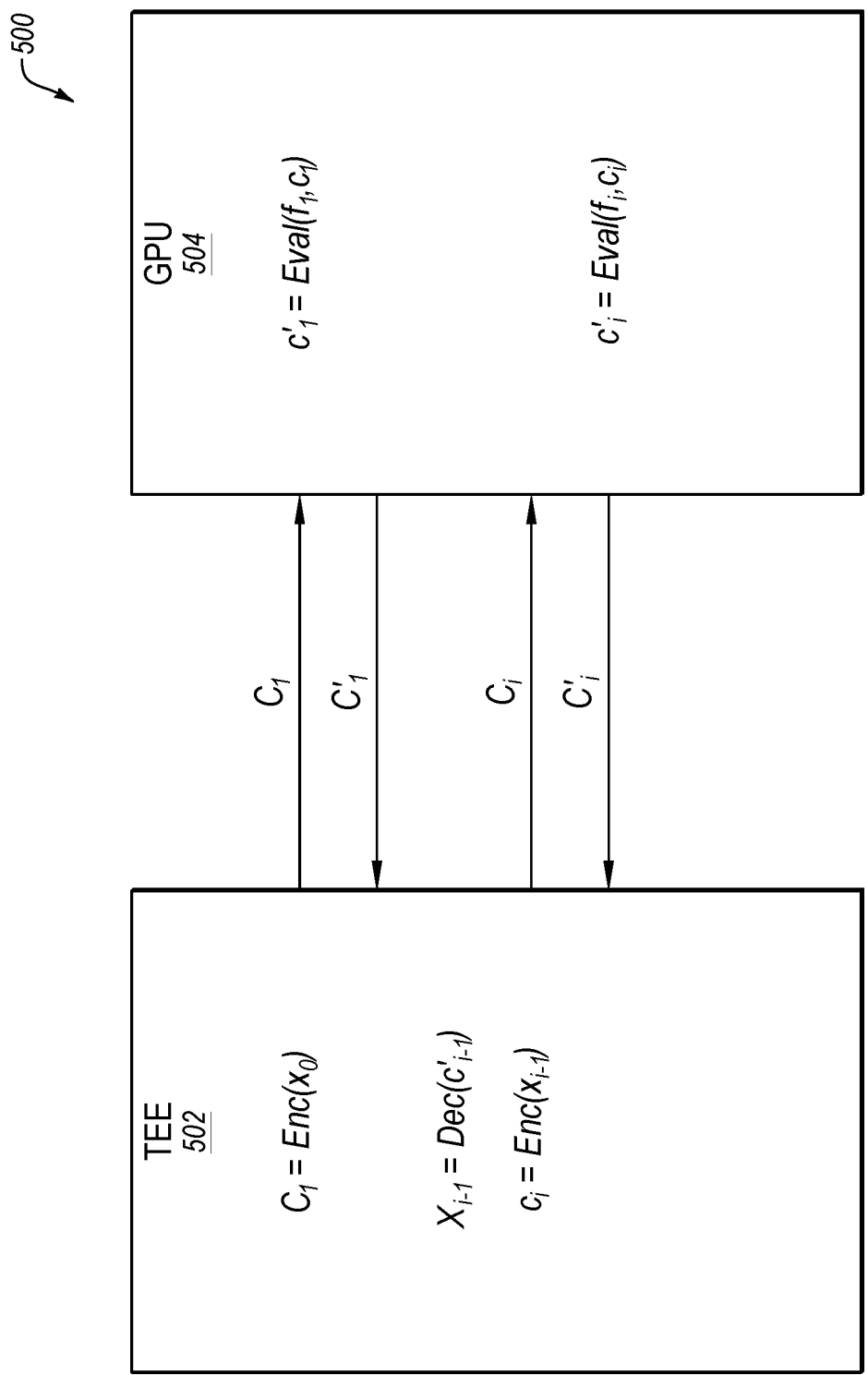
FIG. 5 illustrates an example system including a plurality of processing units.

For example, FIG. 5 depicts an example system 500 including a TEE 502 and a GPU 504. In one contemplated operation, TEE 502 may encrypt an input $x_0$ to generate ciphertext $c_1$, which may be sent to GPU 504. Further, GPU 504 may evaluate ciphertext $c_1$ to generate ciphertext $c_{1'}$, which may be conveyed to TEE 502. Further, TEE 502 may decrypt ciphertext $c_{i'-1}$ to generate $x_{i-1}$. Further, Tee 502 may encrypt $x_{i-1}$ to generate $c_i$. Moreover, GPU 504 may evaluate ciphertext $c_i$ to generate ciphertext $c_{i'}$, which may be conveyed to TEE 502.

For example, in a secure deep learning application, neural networks may be securely evaluated via one or more embodiments of the present disclosure. Neural networks may include layered execution of two basic operations, inner product and thresholding. The inner product evaluation may be a simple form of multiplication that can be outsourced to a processor (e.g., processor 106 of FIG. 1, which may include a GPU) after applying a secret key SHE at a TEE (e.g., TEE 104 of FIG. 1).

In this embodiment, the processor (e.g., the GPU) may also facilitate the inner product computations over all inputs (e.g., via SIMD linear algebra operations.) Thus, according to various embodiments, a GPU may be leveraged for parallel computation of each layer of the neural network.

As another example, eigenvalues and eigenvectors may be securely computed. In this example, general algorithms may apply to many higher level algorithms, such as, principal component analysis and quadratic optimization problems. In turn, these algorithms may be used in many machine learning algorithms, such as, support vector machine (SVMs) and domain specific problems (e.g., PageRank and recommendation systems). This example may include iterations of vector and matrix product computations.

According to various embodiments, iterations maybe outsourced to a processor (e.g., processing unit 106 (e.g., a GPU)), which may support linear algebra operations, and encrypted iteration results may be refreshed using a TEE (e.g., TEE 104 of FIG. 1).

Figure 6:
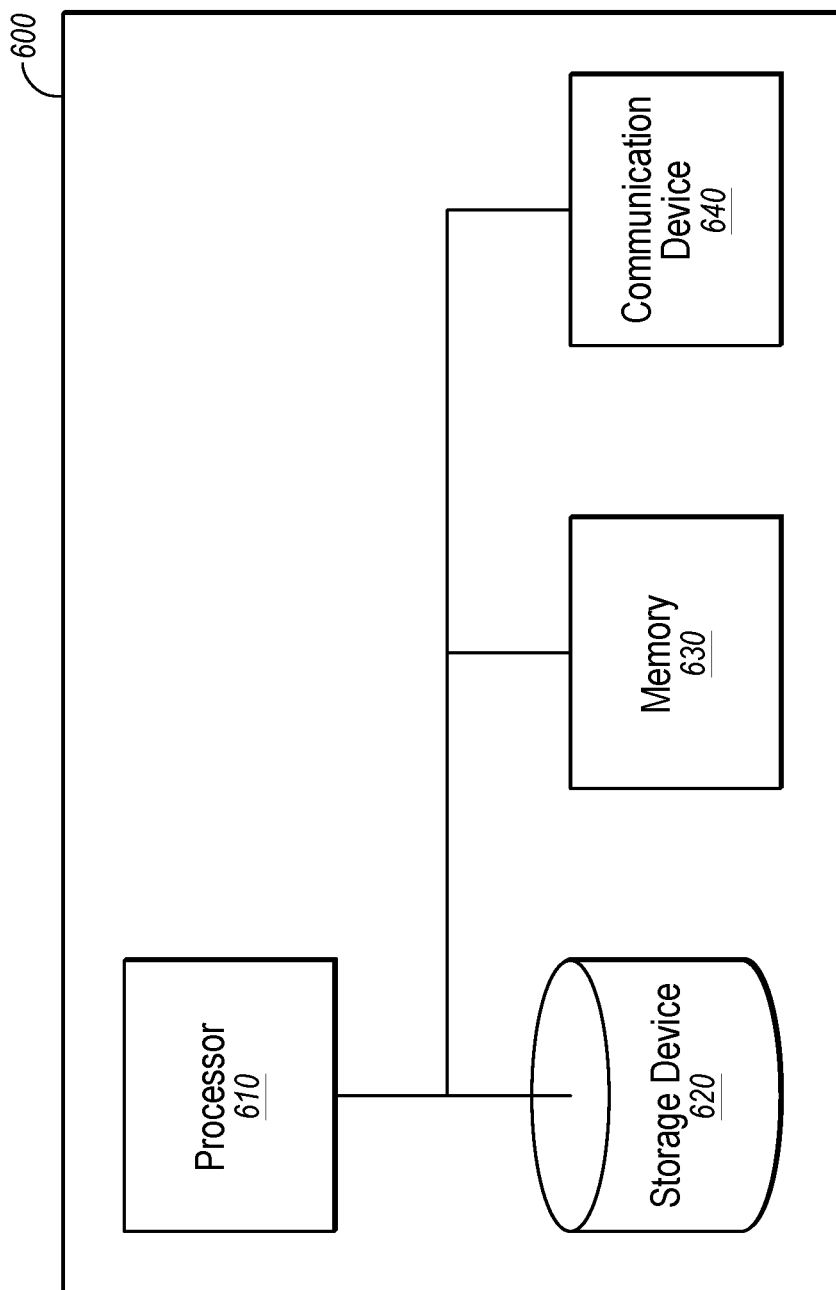
FIG. 6 is a block diagram of an example computing system.

FIG. 6 illustrates an example system 600, according to at least one embodiment described herein. System 600 may include any suitable system, apparatus, or device configured for determining whether to outsource an operation and/or outsourcing one or more operations with encryption. System 600 may include a processor 610, a memory 620, a data storage 630, and a communication device 640, which all may be communicatively coupled. Data storage 630 may include various types of data, such as operation times (e.g., computation times, encryption times, evaluation time, and/or decryption times), data (e.g., encrypted and/or decrypted), function data, secret keys, and/or other data associated with outsourcing (and possibly determining whether to outsource) one or more operations with encryption.

Generally, processor 610 may include any suitable special-purpose or general-purpose computer, computing entity, or processing device including various computer hardware or software modules and may be configured to execute instructions stored on any applicable computer-readable storage media. For example, processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that processor 610 may include any number of processors distributed across any number of network or physical locations that are configured to perform individually or collectively any number of operations described herein. In some embodiments, processor 610 may interpret and/or execute program instructions and/or process data stored in memory 620, data storage 630, or memory 620 and data storage 630. In some embodiments, processor 610 may fetch program instructions from data storage 630 and load the program instructions into memory 620.

After the program instructions are loaded into memory 620, processor 610 may execute the program instructions, such as instructions to perform one or more blocks of method 200 and/or method 300 as described herein. According to various embodiments, processor 610 may run SHE and/or FHE operations. For example, processor 610 may determine operation times (e.g., computation times, encryption times, evaluation times, and/or decryption times). Further, for example, processor 610 may perform SHE operations (e.g., Eval function), encrypt and/or decrypt data (e.g., input and/or messages).

Memory 620 and data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 610 to perform a certain operation or group of operations.

Communication unit 640 may include any component, device, system, or combination thereof that is configured to transmit or receive information over a network. In some embodiments, communication unit 640 may communicate with other devices at other locations, the same location, or even other components within the same system. For example, communication unit 640 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. Communication unit 640 may permit data to be exchanged with a network and/or any other devices or systems described in the present disclosure. For example, communication unit 640 may allow system 600 to communicate with other systems and/or devices.

Modifications, additions, or omissions may be made to system 600 without departing from the scope of the present disclosure. For example, data storage 630 may be multiple different storage mediums located in multiple locations and accessed by processor 610 through a network.

As indicated above, the embodiments described herein may include the use of a special purpose or general purpose computer (e.g., processor 610 of FIG. 6) including various computer hardware or software modules, as discussed in greater detail below. Further, as indicated above, embodiments described herein may be implemented using computer-readable media (e.g., memory 620 or data storage 630 of FIG. 6) for carrying or having computer-executable instructions or data structures stored thereon.

As used herein, the terms "module" or "component" may refer to specific hardware implementations configured to perform the operations of the module or component and/or software objects or software routines that may be stored on and/or executed by, for example, processing unit 102, processing unit 104 (see FIG. 1), and/or computing system 600. In some embodiments, the different components and modules described herein may be implemented as objects or processes that execute on a computing system (e.g., as separate threads). While some of the system and methods described herein are generally described as being implemented in software (stored on and/or executed by system 600), specific hardware implementations or a combination of software and specific hardware implementations are also possible and contemplated. In this description, a "computing entity" may include any computing system as defined herein, or any module or combination of modules running on a computing system, such as system 600.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of outsourcing an operation, the method comprising:
   determining an estimated processing time with respect to at least one of:
      encryption, by a trusted execution environment (TEE) to generate a first ciphertext, data related to computation of a function;
      performance, by a graphics processing unit (GPU), of at least one somewhat homomorphic encryption (SHE) evaluation operation on the first ciphertext to generate a second ciphertext; and
      decryption, by the TEE, of the second ciphertext;
   determining to outsource the at least one SHE evaluation operation based on the estimated processing time; and
   in response to determining to outsource the at least one SHE evaluation operation:
      encrypting the data at the TEE to generate the first ciphertext;
      conveying the first ciphertext to the GPU;
      performing, at the GPU, the at least one SHE evaluation operation on the first ciphertext to generate the second ciphertext;
      conveying the second ciphertext to the TEE; and
      decrypting, at the TEE, the second ciphertext to compute the function.

2. The method of claim 1, further comprising at least one of:
   encrypting second data at the TEE to generate a third ciphertext while substantially simultaneously performing the at least one SHE evaluation operation on the first ciphertext; and
   performing the at least one SHE evaluation operation on the third ciphertext while substantially simultaneously decrypting the second ciphertext.

3. The method of claim 1, wherein the SHE evaluation operation is associated with at least one of a plurality of SHE schemes and wherein the method further comprises bootstrapping the plurality of SHE schemes to support one or more arbitrary functions.

4. The method of claim 1, wherein decrypting the second ciphertext comprises decrypting the second ciphertext via a secret key generated at the TEE.

5. The method of claim 1, wherein performing the at least one SHE evaluation operation comprises evaluating the first ciphertext based on an intermediate function.

6. The method of claim 1, wherein encrypting data comprises encrypting data via homomorphic encryption.

7. A system, comprising:
   one or more processing units configured to cause the system to perform operations, the operations comprising:
      determine an estimated processing time with respect to at least one of:
         encryption, by a trusted execution environment (TEE) to generate a first ciphertext, data related to computation of a function;
         performance, by a graphics processing unit (GPU), of at least one somewhat homomorphic encryption (SHE) evaluation operation on the first ciphertext to generate a second ciphertext; and
         decryption, by the TEE, of the second ciphertext;
      determine to outsource the at least one SHE evaluation operation based on the estimated processing time; and
      in response to determining to outsource the at least one SHE evaluation operation:
         encrypt the data at the TEE to generate the first ciphertext;
         convey the first ciphertext to the GPU;
         perform, at the GPU, the at least one SHE evaluation operation on the first ciphertext to generate the second ciphertext;
         convey the second ciphertext to the TEE; and
         decrypt, at the TEE, the second ciphertext to compute the function.

8. The system of claim 7, wherein the operations further comprise at least one of:
   encrypt second data at the TEE to generate a third ciphertext and perform the at least one SHE evaluation operation on the first ciphertext substantially simultaneously; and
   perform the at least one SHE evaluation operation on the third ciphertext and
   decrypt the second ciphertext substantially simultaneously.

9. The system of claim 7, wherein the SHE evaluation operation is associated with at least one of a plurality of SHE schemes and wherein the operations further comprise bootstrap the plurality of SHE schemes to support one or more arbitrary functions.

10. The system of claim 7, wherein the TEE is configured to decrypt the second ciphertext via a secret key generated at the TEE.

11. The system of claim 7, wherein the operations further comprise evaluate the first ciphertext based on an intermediate function.

12. The system of claim 7, wherein the data is encrypted via homomorphic encryption.

13. One or more non-transitory computer-readable media that include instructions that, when executed by one or more processors, are configured to cause a system to perform operations, the operations comprising:
   determining an estimated processing time with respect to at least one of:
      encryption, by a trusted execution environment (TEE) to generate a first ciphertext, data related to computation of a function;
      performance, by a graphics processing unit (GPU), of at least one somewhat homomorphic encryption (SHE) evaluation operation on the first ciphertext to generate a second ciphertext; and
      decryption, by the TEE, of the second ciphertext;
   determining to outsource the at least one SHE evaluation operation based on the estimated processing time; and
   in response to determining to outsource the at least one SHE evaluation operation:
      encrypting the data at the TEE to generate the first ciphertext;
      conveying the first ciphertext to the GPU;

performing, at the GPU, the at least one SHE evaluation operation on the first ciphertext to generate the second ciphertext;

conveying the second ciphertext to the TEE; and decrypting, at the TEE, the second ciphertext to compute the function.

14. The computer-readable media of claim 13, the operations further comprising at least one of:

encrypting second data at the TEE to generate a third ciphertext while substantially simultaneously performing the at least one SHE evaluation operation on the first ciphertext; and performing the at least one SHE evaluation operation on the third ciphertext while substantially simultaneously decrypting the second ciphertext.

15. The computer-readable media of claim 13, wherein the SHE evaluation operation is associated with at least one of a plurality of SHE schemes and wherein the operations further comprise bootstrapping the plurality of SHE schemes to support one or more arbitrary functions.

16. The computer-readable media of claim 13, wherein decrypting the second ciphertext comprises decrypting the second ciphertext via a secret key generated at the TEE.

17. The computer-readable media of claim 13, wherein performing the at least one SHE evaluation operation comprises evaluating the first ciphertext based on an intermediate function.

\* \* \* \* \*